UNITED STATES PATENT OFFICE

2,077,591

MERCURATED SALICYL ARYL AMIDES

Frederick Lawrence Sharp and Marmaduke Barrowcliff, Blackley, Manchester, England, assignors to Imperial Chemical Industries Limited, a corporation of Great Britain No Drawing. Application August 24, 1933, Serial No. 686,650. In Great Britain September 4, 1932

2 Claims. (Cl. 260—13)

The arylamides of salicylic acid and its derivatives are known (see British specification No. 323,579) to possess excellent fungicidal properties and have found extensive use for this purpose.

The present invention relates to the production of new compounds from these salicylarylamides. The new compounds have properties which make them valuable not only for some of the uses for which the parent compounds are adapted, but also for use as ingredients in dry seed disinfectants.

According to the invention we treat the said salicyl arylamides with a known mercurating agent, for example, mercuric acetate. The mercuration is carried out conveniently in aqueous solution, but other media, e. g. alcohol or aqueous alcohol, may be used. The salicyl arylamide may be used in the form of its alkali or other soluble salt.

As arylamides of salicylic acid or its derivatives adapted for treatment according to the invention we may mention salicyl anilide, salicyl-o-toluidide, salicyl-p-toluidide, salicyl-o-anisidide, 5-chlorosalicylanilide, β-resorcylanilide.

The mercurated salicylarylamides obtained in accordance with the invention are white or faintly coloured powders, insoluble in water, decomposing with some indication of fusion on heating to about 200° C. They dissolve in dilute aqueous caustic soda and are reprecipitated on acidification.

The mercurated salicylanilides are useful as ingredients in liquid media for application as sprays or for dipping purposes in agriculture and horticulture. For this purpose they are dispersed e. g. by grinding them with aqueous solutions containing known dispersing agents, e. g. soap or the sulphonated condensation products of naphthalene and formaldehyde.

The mercurated salicylanilides are particularly valuable when used as ingredients in dry seed disinfectants. For this purpose they are mixed intimately with a suitable diluent, e. g. talc, and with, if desired, a small amount of pigment, e. g. iron oxide, and some agent, e. g. oil or glycerine, to prevent the powder from being dusty.

The following examples illustrate, but do not limit the invention. The parts are by weight.

Example 1

23½ parts of the sodium salt of salicyl anilide acid are dissolved in 250 parts of water and the temperature of the solution is adjusted to 50° C. A solution of 32 parts of mercuric acetate in 250 parts of water is gradually added at 50°. Mercuration proceeds rapidly. That it goes to completion is shown by the fact that the reaction mixture gives no positive test for the presence of ionizable mercury (development of a yellow colour when caustic soda is added). The resulting precipitate is filtered off, washed with water and dried. It is a pale brown powder.

Example 2

The product of Example 1 is mixed with 50 times its weight of a suitable diluent such as talc containing 3% of glycerol as anti-dust agent. The resulting dust is used for the treatment of seed being applied in the usual way. When 2 oz. per bushel is used on oats the seed obtained germinates well and the plants are relatively free from disease. Thus on a test it was found that whereas untreated seed gave 11% of plants suffering from stripe, the treated seed gave less than 1.5%.

Example 3

63 parts of free salicylanilide are stirred into 630 parts of water and made just alkaline by the addition of sufficient of 8% aqueous sodium hydroxide. The solution is heated to 75–85° C. and 63 parts of yellow mercuric oxide are gradually added. The mixture is kept at 75–80° C. and stirred until mercuration is complete. This takes about one hour. To the suspension about its own bulk of water is added to facilitate later handling. The cooled suspension is now made neutral to litmus by adding hydrochloric acid. The solid product is filtered off, washed, and dried. This product resembles that of Example 1 and is used in a similar way.

Instead of salicyl anilide, salicyl p-toluidide, or salicyl-o-anisidide may be used, in the appropriate stoichiometric proportions.

As many apparently widely different embodiments of the invention may be made without departing from the spirit and scope thereof, it is to be understood that I do not limit myself to the specific embodiments hereof except as defined in the following claims.

We claim:
1. A mercurated aromatic amide of salicylic acid in which the aromatic group is of the benzene series.
2. Mercurated salicyl anilide.

FREDERICK LAWRENCE SHARP.
MARMADUKE BARROWCLIFF.